United States Patent
Puskoor et al.

(10) Patent No.: US 7,890,091 B2
(45) Date of Patent: Feb. 15, 2011

(54) COLLABORATIVE DATA AND INTELLIGENT SYNCHRONIZATION FOR MOBILE DEVICES

(75) Inventors: Dayakar Puskoor, Colleyville, TX (US); Alexandru M. Farcasiu, Southlake, TX (US)

(73) Assignee: Good Technology, Inc., Santa Clara, CA (US)

( * ) Notice: Subject to any disclaimer, the term of this patent is extended or adjusted under 35 U.S.C. 154(b) by 147 days.

(21) Appl. No.: 10/434,138

(22) Filed: May 8, 2003

(65) Prior Publication Data

US 2004/0224675 A1    Nov. 11, 2004

(51) Int. Cl.
*H04M 3/00*    (2006.01)
(52) U.S. Cl. .............. 455/419; 455/418; 455/420; 707/999.201; 707/999.01; 707/999.001; 709/216; 709/219; 709/248
(58) Field of Classification Search ......... 455/418–420, 455/517, 414.1, 414.2, 412.1, 412.2, 414.3, 455/556.1, 556.2, 557, 558; 707/999.001, 707/999.01, 999.1, 999.101, 999.102, 999.2, 707/999.201, 99.204, 100, 101, 102, 200, 707/201, 10; 709/201, 203, 212–214, 216, 709/217, 219, 227, 228, 248; 370/503, 510, 370/512; 379/93.25, 114.29, 142.06
See application file for complete search history.

(56) References Cited

U.S. PATENT DOCUMENTS

| | | | | |
|---|---|---|---|---|
| 5,758,355 | A | * | 5/1998 | Buchanan .......................... 1/1 |
| 5,787,442 | A | * | 7/1998 | Hacherl et al. ..................... 1/1 |
| 6,112,209 | A | * | 8/2000 | Gusack .............................. 1/1 |
| 6,636,873 | B1 | * | 10/2003 | Carini et al. ................. 707/201 |
| 6,799,190 | B1 | * | 9/2004 | Boothby ..................... 707/204 |
| 7,496,606 | B2 | * | 2/2009 | Hind et al. ........................ 1/1 |
| 2002/0059299 | A1 | * | 5/2002 | Spaey ..................... 707/104.1 |
| 2003/0124493 | A1 | * | 7/2003 | Kulack ....................... 434/118 |
| 2003/0145040 | A1 | * | 7/2003 | Tohara et al. ............... 709/203 |
| 2004/0078569 | A1 | * | 4/2004 | Hotti .......................... 713/165 |
| 2004/0203556 | A1 | * | 10/2004 | Litwin ........................ 455/403 |
| 2004/0225693 | A1 | * | 11/2004 | Ganji et al. ................. 707/201 |

* cited by examiner

*Primary Examiner*—Anthony S. Addy
(74) *Attorney, Agent, or Firm*—Knobbe Martens Olson & Bear (57) ABSTRACT

Embodiments of a system and method for copying data from a database to an intelligent mobile device are disclosed. One embodiment comprises a means to define a data linking schema, a means to selectively read data from a database based on this data linking schema, a means to prepare the intelligent mobile device to receive data transmissions, and a means to transmit data to the intelligent mobile device.

18 Claims, 6 Drawing Sheets

COLLABORATIVE DATA AND INTELLIGENT SYNCHRONIZATION FOR MOBILE DEVICES

TECHNICAL FIELD

The invention relates in general to communication systems, and in particular to collaborative data and intelligent synchronization for mobile devices.

BACKGROUND INFORMATION

Intelligent mobile devices including personal digital assistants ("PDA" s), smart phones, and small hand-held computers are becoming more common. Use of these mobile devices is no longer limited to technologically savvy professionals: increasingly these devices are being integrated into mass business processes such as parcel delivery. Some companies are using these devices to deploy a uniform workflow process to employees. Mobile devices may be loaded with data from the enterprise database, from the user's workstation, from the user's personal computer ("PC"), or from other sources. This data which the mobile devices store may include information from computer-based address books, computer-based appointment calendars, computer-based sales histories, computer-based inventory information, etc. It may be useful to occasionally update the mobile device's stored data from these fixed position data storage devices. The activity of updating the mobile device's stored data may be referred to as synchronizing the mobile or synching the mobile.

Databases are computer based stores of information. Databases may be conceived of as constructed of multiple rows of information, with each row having identical internal information structure. Rows of information may be added to a database or deleted from a database. Existing rows in a database may be modified by changing the information contained in the row. The structure of database rows—sometimes referred to as the format or schema of the rows, the format or schema of the database—specifies a sequence of fields and the information content of these fields. For instance, a row format for an employee database may include fields containing employee name, employee home address, employee home phone number, employee hire date, employee department number, supervisor's name, etc. Some fields may contain sequences of characters of arbitrary length, other fields may contain a small integer, other fields may contain other data formats. Because a sequence of database rows may be conceived to line up so that the fields line up in columns, database contents are sometimes referred to as database tables. Sometimes a single table arrangement of data is referred to as a database, and multiple databases are considered to reside on a single mass storage disk memory device or to be supported by a single database access computer program or application. Other times a database is conceived to have multiple independent tables of information and covers the entire database access application, perhaps accessing storage across several mass storage disk memory devices. These concepts are well understood by those skilled in the art.

Current mobile synchronization solutions require the mobile user to select individual data items for synchronization or to synchronize all available data. Selecting individual items is tedious and subject to error. Further, selecting individual items does not support deploying a uniform work process: different employees may select different subsets of data to synchronize, and their work processes may vary undesirably from one another as a consequence. Synchronizing all available data is inefficient when only a subset of data is needed. In this case excess communication bandwidth is consumed in transmitting and excess memory in the mobile device is consumed in storing the unneeded data. Both of these inefficiencies involve increased costs of operation. Excessive bandwidth consumption implies extra airtime and consequent higher billing (if a different business model applies and billing to the subscriber is not increased, then the service provider bears this extra cost). Excess mobile device memory consumption implies paying for mobile units with more memory than actually needed.

What is needed, therefore, is a system or method for data collaboration and intelligent synchronization of data in the mobile environment.

SUMMARY OF THE INVENTION

Embodiments of a system and method for copying data from a database to an intelligent mobile device are disclosed. One embodiment comprises a means to define a data linking schema, a means to selectively read data from a database based on this data linking schema, a means to prepare the intelligent mobile device to receive data transmissions, and a means to transmit data to the intelligent mobile device.

DETAILED DESCRIPTION OF THE INVENTION

The present invention provides a unique method and system for performing intelligent synchronization of mobile devices with a database or multiple databases using collaborative data to identify what data to synchronize. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
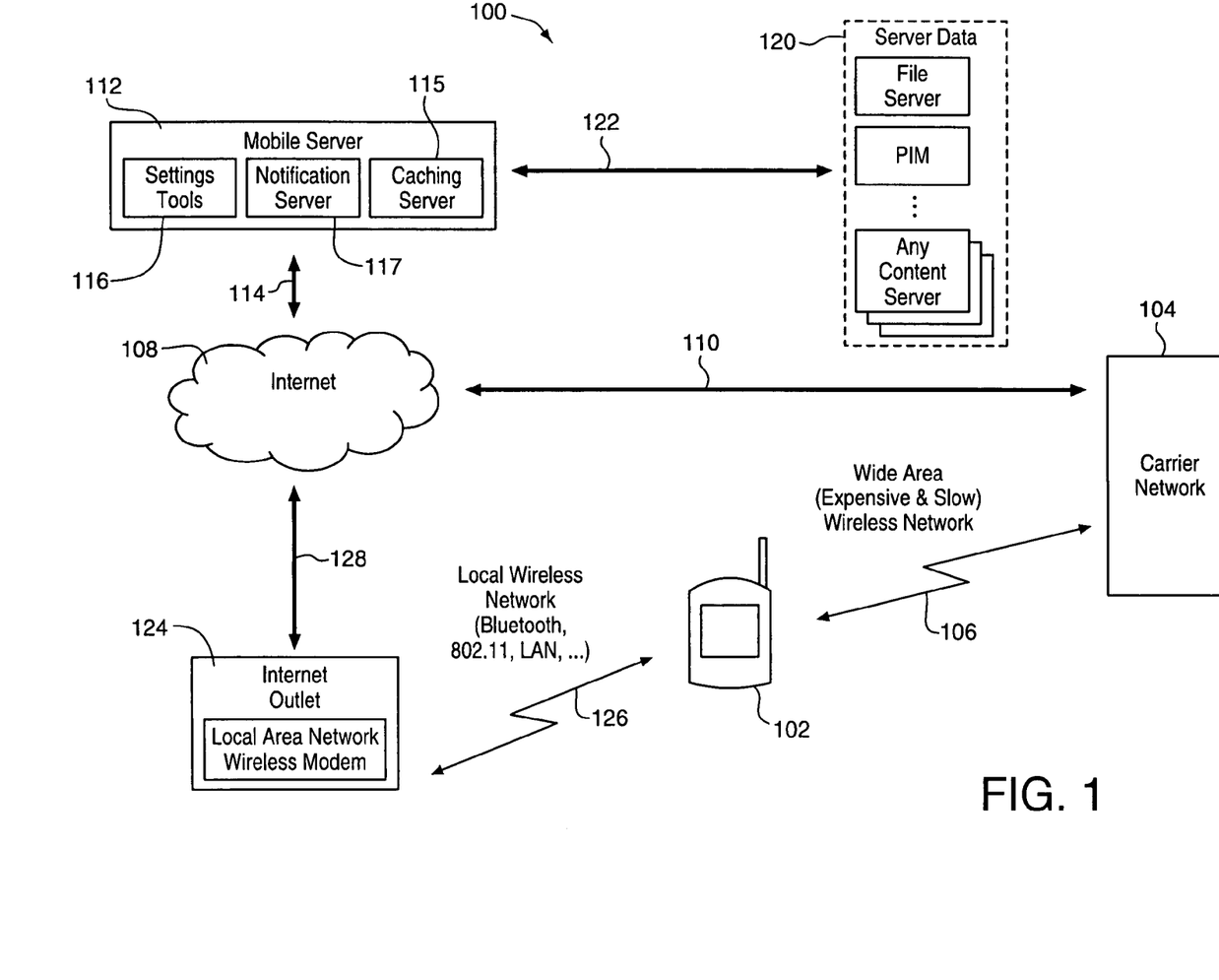
FIG. 1 depicts an exemplary system for implementing various embodiments of the present invention.

Turning now to FIG. 1, an exemplary communication system and network 100 is shown which may implement various embodiments of the present invention. A mobile device 102 is depicted in communication with a carrier network 104 via a wireless wide area network ("W-WAN") connection 106. A public network, such as the Internet 108, is shown in communication with the carrier network 104 via a high speed connection 110. A mobile server 112 is shown in communication with the Internet 108 over a high speed connection 114. The mobile server 112 may be a dedicated computer processor or an application running on a computer processor. In some embodiments, the mobile server 112 comprises a caching server 115, a notification server 116, and settings tools 117 which allow for the configuration of the mobile server. This information changes often, and the usefulness of intelligent mobile devices may depend upon these mobile devices being notified as the information changes. Notification is the process in which a server program (e.g. a notification server) alerts a mobile device about a change in the enterprise data.

The notification server notifies the mobile device 102 when a synchronization may be required. A detailed explanation of the notification server may be found in the Applicant's co-pending patent application entitled "A System And Method For Notifying Mobile Devices Based On Device Type And Network Capabilities", filed on May 7, 2003, having Ser. No. 10/430,943 (issued Sep. 25, 2007 as U.S. Pat. No. 7,275,073), the disclosure of which is hereby incorporated by reference.

The caching server 115 supports intelligent synchronization of mobile devices as well as executing applications supporting other services for mobile devices. In several exemplary embodiments, the caching server 115 keeps a list of all data sources URLs (Uniform Resource Locators) and drivers needed in order to access them. The caching server 115 may simultaneously execute multiple synchronization threads for multiple users. The caching server 115 may also keep a map of already synchronized records and to allow only updates to and from the device. Based on the current intelligent synchronization schema the caching server 115 instructs a caching agent as to which database to keep or include in the sychronization.

At least one enterprise database 120 is in communication with the mobile server 112 via a high speed connection 122. Although the enterprise database is shown as one database, a company or organization may have multiple enterprise databases. These databases may be associated with separate applications or may be shared by several applications. Typical applications include: customer lists, contact information, appointment schedules, etc., and other data important to a company may be stored in the enterprise database (e.g., the database or databases used by the corporate headquarters or divisional office).

In some alternative embodiments, there may be an Internet outlet 124 which may be communication with the mobile device 102 via a wireless local area network ("WLAN") connection 126. The Internet outlet 124 communicates with the Internet via high speed connection 128.

Figure 2:
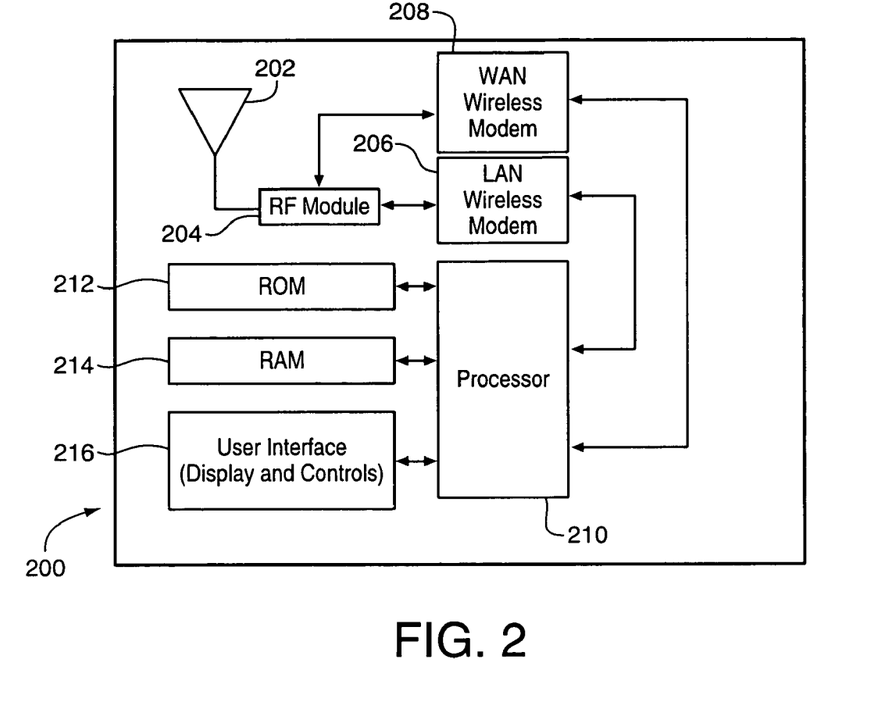
FIG. 2 depicts an exemplary mobile device.

Turning now to FIG. 2, there is presented a simplified block diagram of one embodiment of the exemplary mobile device 102. In this illustrative embodiment, an RF antenna 202 is connected to an RF module 204. The antenna 202 receives and transmits communications signals. The RF module 204 converts base band information into an RF format and amplifies the signal to a power level suitable to transmission and converts received RF signals to base band information suitable to processing within the mobile device 102. The RF Module 204 may be connected to a local area network ("LAN") wireless modem 206 and, optionally to a wide area network ("WAN") wireless model 208. The LAN wireless modem 206 and WAN wireless modem 208 may be in communication with a processor 210. The LAN wireless modem 206 receives signals from the processor 210 which it modulates and sends to the RF module 204. The LAN wireless modem 206 receives signals from the RF module 204 which it demodulates and sends to the processor 210. The WAN wireless modem 208 receives signals from the processor 210 which it modulates and sends to the RF module 204. The WAN wireless modem 206 receives signals from the RF module 204 which it demodulates and sends to the processor 210.

In the illustrative embodiment, the processor 210 controls the basic operations of the mobile device 102. The processor 210 may be coupled to one or more memory devices, such as random access memory "RAM" 214. The RAM 214 may be used for the temporary storage of data used in processing signals and the operation of the mobile device 102. In some embodiments, the processor 210 reads instructions, such as processing and operating logic from a set of read-only memory "ROM" 212. In other embodiments, ROM 212 could be flash memory or another non-volatile form of memory and the processor 210 may be one or more processors or circuits. A user interface 216 may provide a display and control inputs. The user interface 216 may be in communication with the processor 210 by a plurality of electrical conductors which permit the processor 212 to control the display and to receive inputs.

Figure 3:
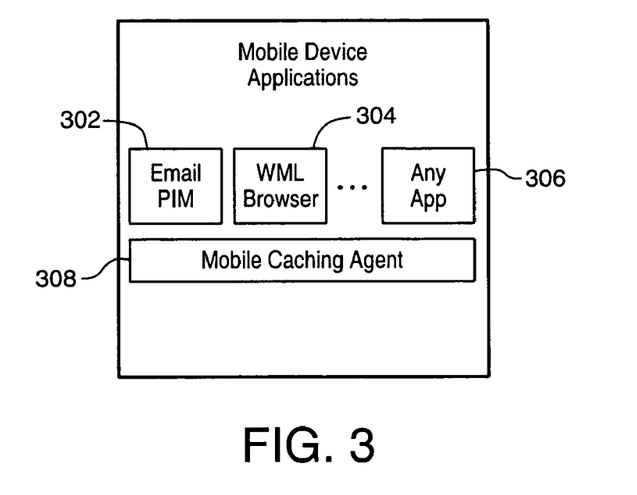
FIG. 3 depicts instructions running on a mobile device.

Typically the processor 210 will execute computer programs or "applications" which may include an email PIM 302 application other applications 306, as shown illustrated in FIG. 3. Additionally, the mobile device 102 may run a mobile caching agent 308 program. The mobile caching agent 308 may create, delete and update databases in the mobile as requested by the server caching agent based on the current intelligent caching schema. The mobile agent will also listen for incoming notification events and based on the content start synchronization. A major refresh of the local cache can be time based (like every day at hh:mm) or triggered by notification based on a schedule stored on the caching server.

One aspect of the invention supports "caching" or downloading a predetermined subset of data from the enterprise databases onto mobile devices. Thus, when the mobile device synchronizes it is updated by the caching server with a selected subset of data—the data which the mobile user may need, perhaps to carry on the business of this day. For example, the subset of data may include the mobile user's calendar entry for a sales call to a customer that the user will make that day, the phone number of the customer, a reference to a white paper describing the customer's products (perhaps summarized as table of contents entries, due to restrictions of mobile memory capacity as well as display capacity), and other data relating to the customer. Because of the memory limitations of the mobile device, the subset of information relating to that particular customer would be downloaded for a predetermined time (when dealing with the customer). The next day or week, a new subset of data relating to another customer may be downloaded.

The identification of an expedient subset of data may be accomplished through using a data linking schema. When a mobile device 102 initiates synchronization, the mobile server 112 may execute the caching server program 115 which employs a data linking schema associated with the mobile device 102 to select data from the enterprise database 120 which is then copied to the mobile device 102. In some embodiments, mobile users who have access authorization may create their own data linking schema. In other cases it may be preferred that an administrator create a data linking schema to be used by multiple mobile users, perhaps when deploying a uniform business process.

Figure 4:
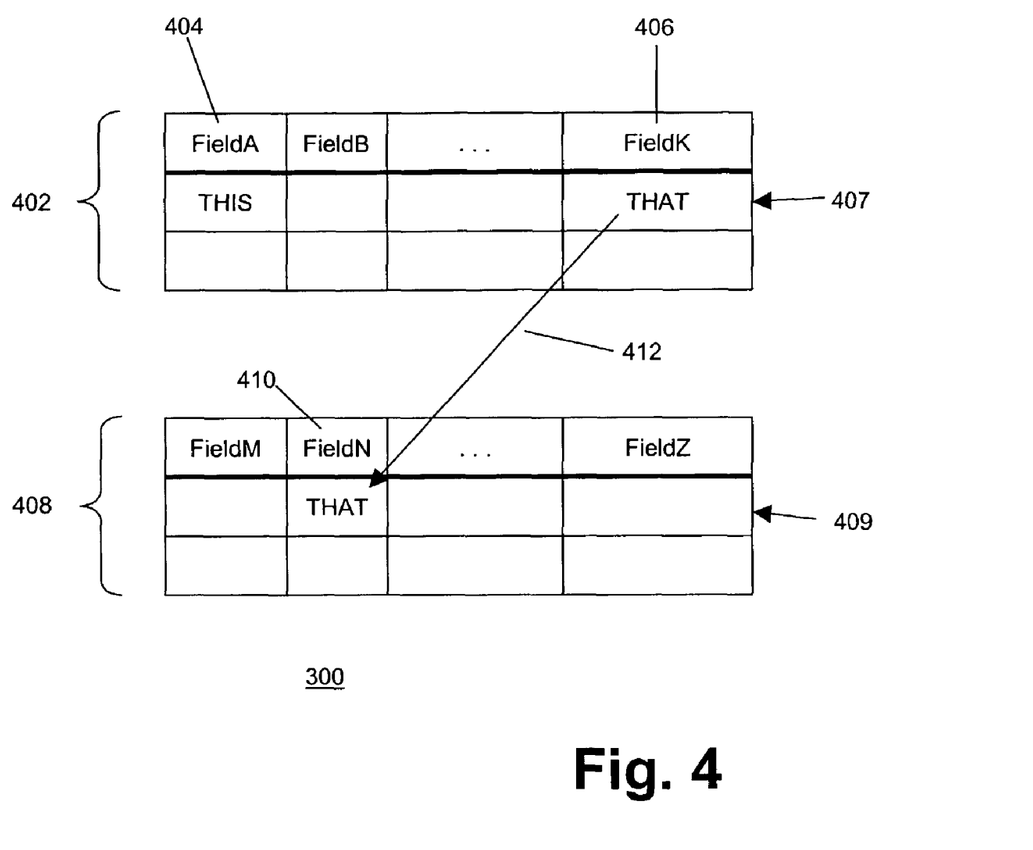
FIG. 4 depicts a generalized linkage between two database tables.

Turning now to FIG. 4, a linkage between two database tables is depicted. These tables are depicted as generally as possible to focus on the concept of using a field in one database table to provide linkage to a field in another database table. A database table 402 contains multiple data or "attributes" fields including a FieldA 404 and a FieldK 406.

For a record 407 of the database table 402, the value of FieldA is "THIS" and the value of FieldK is "THAT".

A database table 408, which may be for a different application than the application using the database table 402, may also contain multiple data fields including a FieldN 410. For a record 409 in the database table 408, the value of FieldN 410 is "THAT." A link may be defined from the FieldK 406 of the database table 402 to the FieldN 410 of the database table 408. Thus, if the value found in the FieldK 406 column is found in the FieldN 410 column for any record of the database 408, the record of the database 408 is selected (e.g. record 409).

In this example, the database table 402 may be said to be forward linked to the database table 408, and the database table 408 may be said to be backward linked to the database table 402 in this example. Suppose that records in database table 402 which contain the value 'THIS' in FieldA are selected, then the defined linkage would lead to selection of all records in database table 408 which contain the value 'THAT' in their FieldN 410 because the selected record in database table 402 contains a 'THAT' value in its FieldK 406. Multiple records of the database 408 may be selected by a single record of the database table 402: this would happen if multiple records of the database table 408 contain the value 'THAT' in the FieldN 410 column. These links can be used to chain from one table to another. Such a chain of linkages between database tables is what is meant by the term 'data linking schema.' The property of using values in selected records of database tables to identify records in other database tables for selection is referred to as 'collaborative data.'

Figure 5:
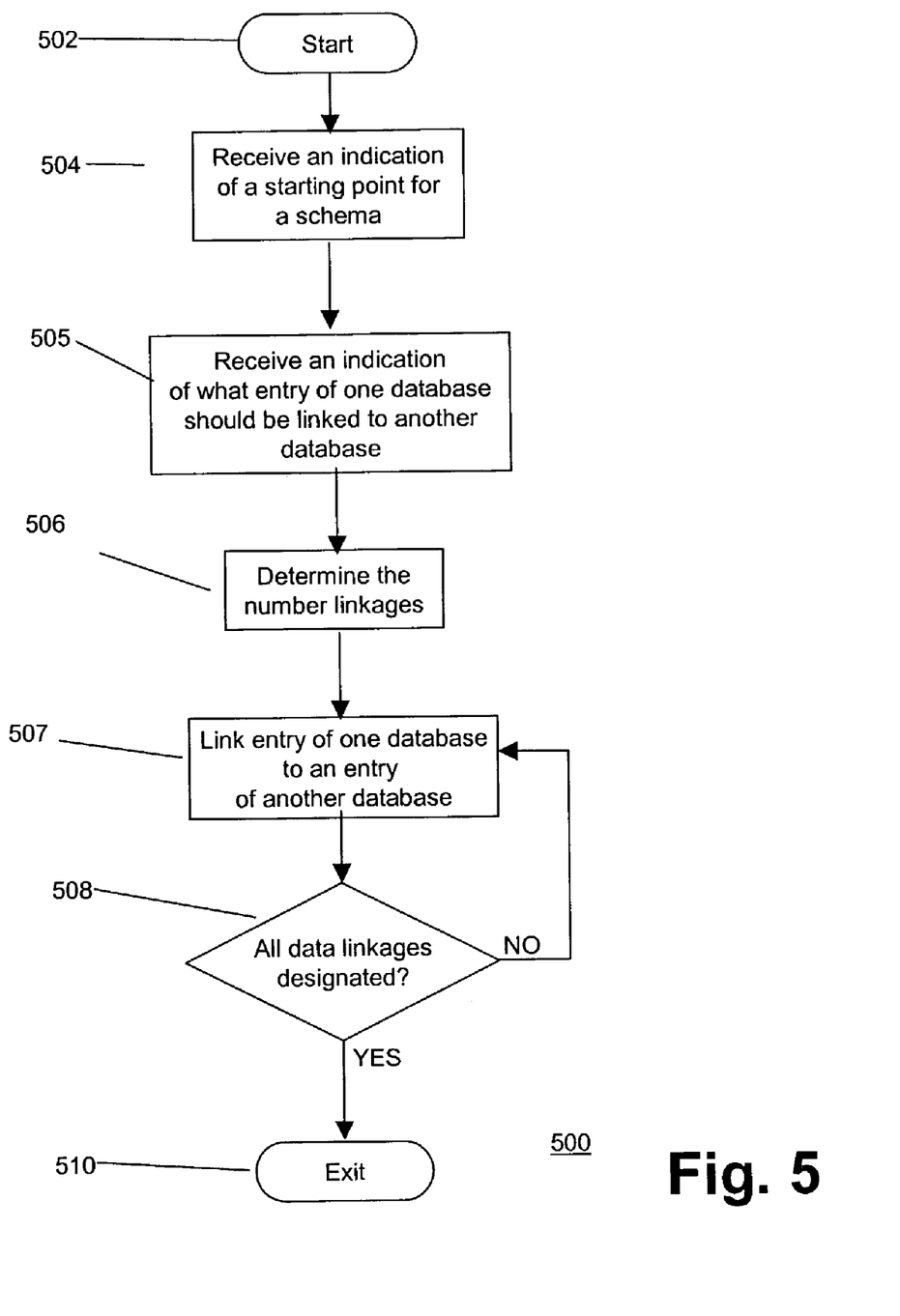
FIG. 5 depicts a process flow diagram for defining a data linking schema.

Turning now to FIG. 5, a flow diagram 500 depicts a process for defining a data linking schema. Data linking schemas may be defined with the aid of a software tool. Such a tool may be a web based interface, use a screen from a mobile device, or use any other common access interface. The process starts at step 502 and flows to step 504 in which the starting point of the linking schema may be defined. A screen may be displayed which allows a user to select a starting point. Such a screen or screens might display several databases and other criteria so that the user may identify a database table, a single data field within that database table, and may input or define a value for this field which may be used as a search key. Such a value may be either a static value or it may be a global variable such as "current date." For example, the starting point of a linking schema may be defined as the calendar database table, date field, using the "current date" as the search key.

The process may then flow to step 505 where, in one embodiment, screens may be displayed allowing the user to select from which application or database to form the linkages. For instance, one user may download his emails and contact information. Another user might want to download contact information and proposal documents. In an alternative embodiment, the screens could be displayed for an administrator so that all users of a particular group would have the same information downloaded.

In any event, after step 506, a determination may be made of the number of linkages to be created. This may be predetermined, set individually by the number of databases selected by the user, or a combination of both.

The process then flows to step 507 where the first linkage may be made starting from the starting point defined in step 504. Thus, if the starting point was the "current date," records relating to a particular user in the calendar database whose date field contains today's date may be selected.

The process flows to step 508 in which a decision is made: if the complete linking schema has been executed the process flows to step 510 and exits. If the complete linking schema has not been executed, the process flows back to 506 and additional link information is added. The data can be gathered either at sync time or in advance based on a predetermined schedule. The first option gives the user access to the latest data but it may create an unpleasant user experience if the data sources have a long access time. The second solution is more appropriate when it is desirable to achieve short sync times. It has the disadvantage of using additional storage space.

In some embodiments, the linkage is expected to flow back to the starting table. For instance, when linking a table C to a table D, the linkage path can be traced back to a starting table A (when table A is linked to table B and table B is linked to table C). Without this continuous linkage path, a link to the dangling table may not be activated by the schema. The tool which supports defining data linking schemas may perform design rules checking and notifies the user of such errors.

Figure 6:
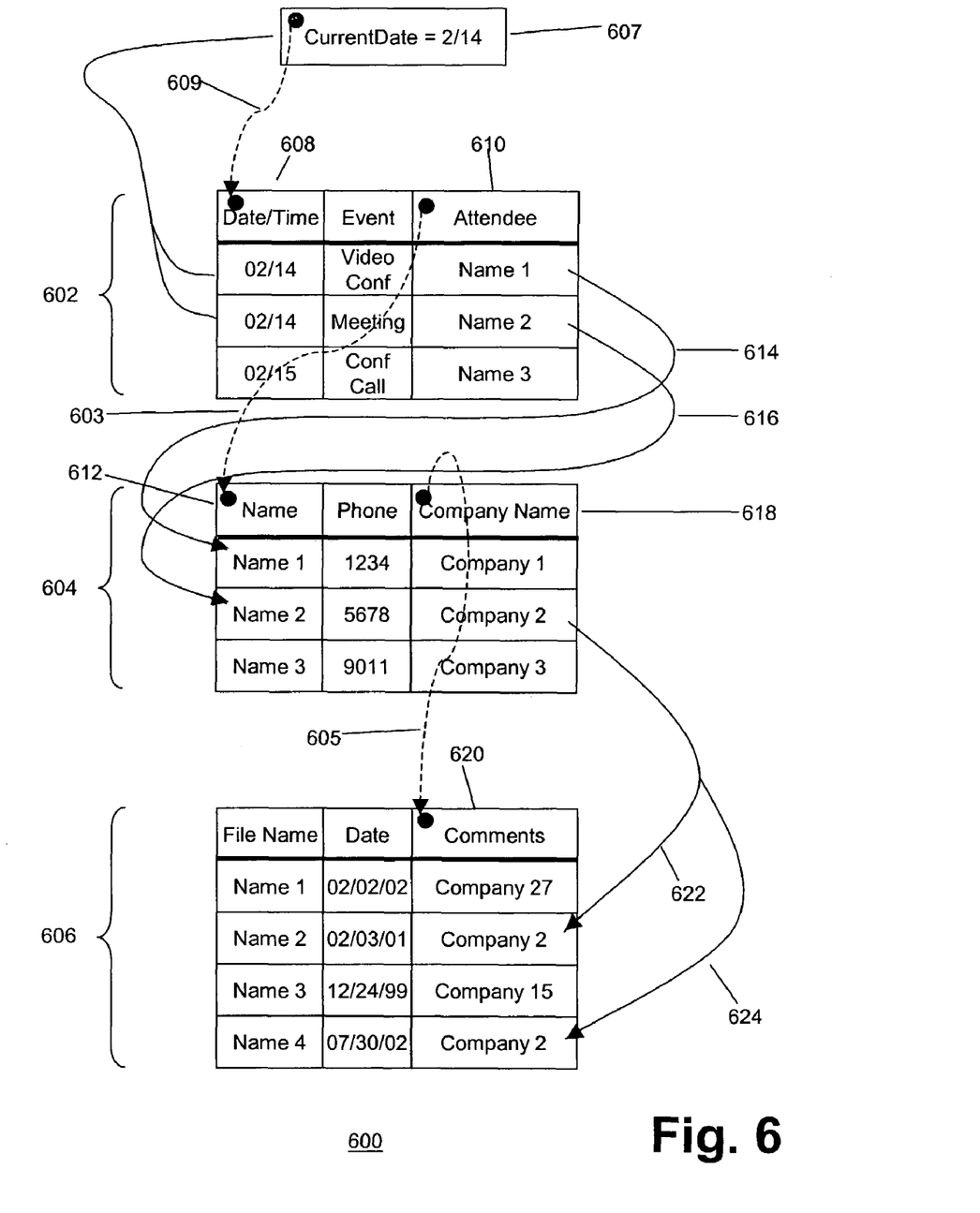
FIG. 6 depicts an exemplary database linking thread for a possible business application.

Turning now to FIG. 6, an example database linking schema operating upon an exemplary series of databases is depicted. A calendar database 602, an address book database 604, and a file database 606 are shown to be linked by forward links 603 and 605. In this example, the key which is the starting point of the linking thread is a current date 607, which is a global variable available from the environment of the mobile server. The calendar database 602 contains a date/time field 608 and an attendee field 610. The current date 607 may be linked to the date/time field 608 by forward link 609: e.g., any record which contains a date value which matches the value of the current date may be selected. Note that as the current date changes, different records will be selected in this first database and this in turn will lead to different records being selected in the whole chain of forward linked tables.

The attendee field 610 may be linked to the name field 612 of the address book database 604 by forward link 603. For every selected record in the calendar database 602 the attendee field 610 value may be used to search in the name field 612 of the address book database 604: when a match is found, that record of the address book database 604 is selected. Here the first two records of the calendar database 602 are shown to be selected and the attendee field 610 values of "Name 1" and "Name 2" are shown selecting each a record in the address book database 604 via linkages 614 and 616 where the name field 612 matches. The company name field 618 of the address book database 604 may be linked to the comments field 620 of the file database 606 by forward link 605. Thus, for every selected record in the address book database 604 the company name field 618 value may be used to search in the comments field of the filename database 606: when a match is found, that record of the filename database 606 may be selected. In this illustrative example, there is no match for the company name field 618 value "Company 1" but there are two selected records shown by linkages 622 and 624 for the company name field 618 value "Company 2."

Other data linking schemas are possible, and other database formats and contents are possible. For reasons of simplicity, this example describes an unforked linking schema, but within the scope of the invention are forked linking schemes. In a forked linking schema, one or more would forward link to more than one other table. For example, the calendar database 602 may also be forward linked to an email database using the attendee name value as the link to the "from" field in the email database table. All selected records in database tables have all their contained data sent out to the synchronizing mobile device.

When a mobile device sends a synchronization request to the mobile server, the caching server software executing on the mobile server handles the request. The caching server uses the appropriate data linking schema to search multiple databases. The mobile device may command the synchronization server to use a specific data linking schema, or the synchronization server may use a data linking schema specified in a configuration file and not grant the mobile device any authority to request a specific data linking schema. The synchronization server uses an algorithm along with the data linking schema to search the databases and identify data selected for copying to the mobile device. When a database record is selected for copying out to the mobile device, the caching server checks to see if this data is already on the mobile device and if it is not present on the mobile device, it copies the data to the mobile device. The caching server also checks to be sure there is sufficient memory available on the mobile device to receive the data and does not copy the data if there is not sufficient available memory. If there is not sufficient memory available, the caching server may free some memory to enable the data transfer.

Figure 7:
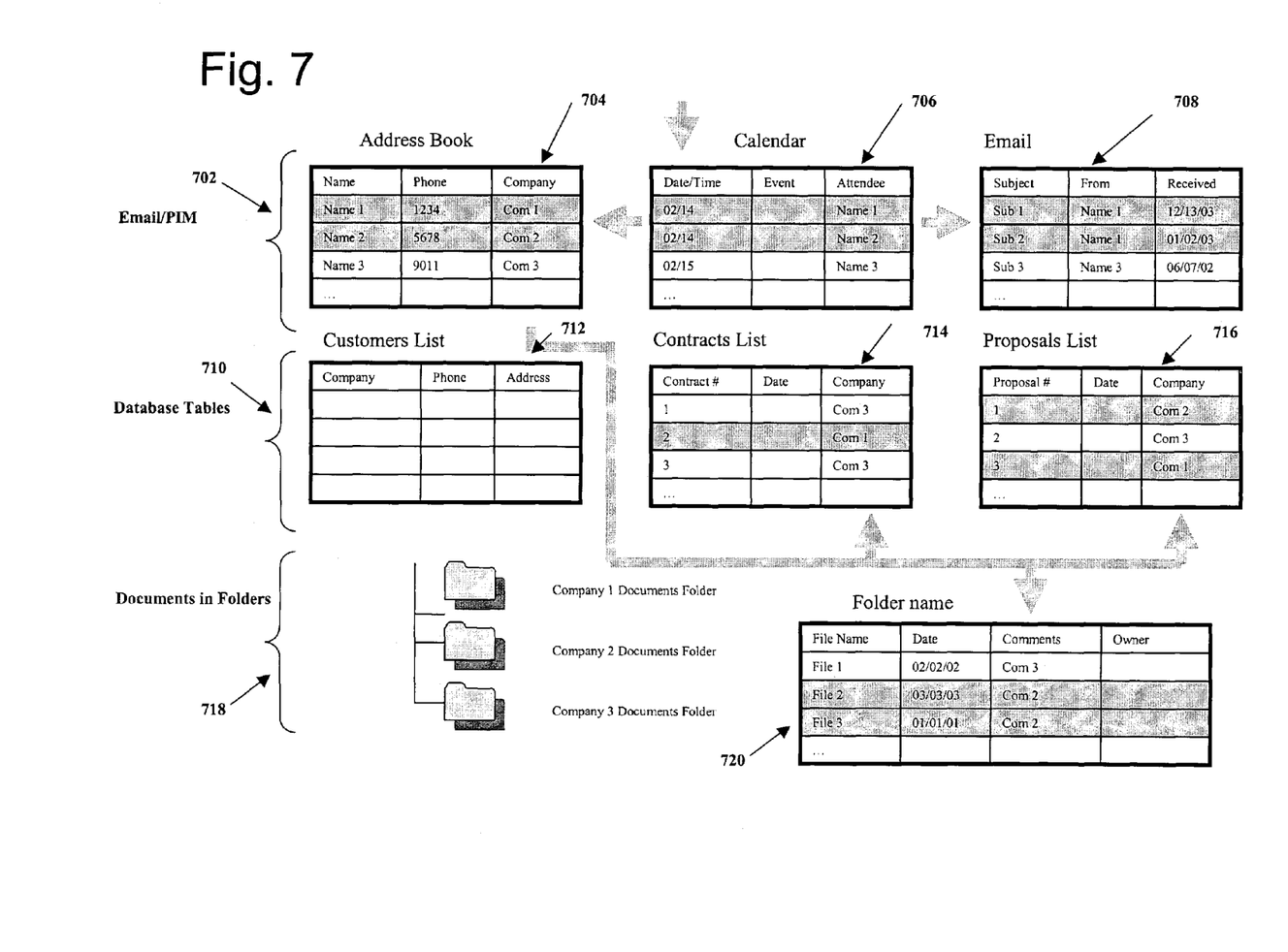
FIG. 7 depicts example business databases which could be linked by the process illustrated in FIG. 5.

Turning now to FIG. 7, there is an example of the type of data which might be employed in the various embodiments of this invention. For instance, email/PIM data 702 may comprise address book databases 704, calendar databases 706, and email databases 708. Other databases may be structured database tables 710 and may include customer list databases 712, contracts list databases 714, and proposal list databases 716. Other databases may be "free-form" or non-structured, for instance, documents in particular folders 718 where the document information may be accessible through a file manager program database 720.

Because the memory of mobile devices is typically limited and the amount of information to be downloaded may not be readily determinable, the maximum amount data to be downloaded on the mobile device may be configurable so that downloaded data will not completely use the memory of the mobile device. Additionally, in some embodiments, the mobile device may detect the network capacity and automatically choose to initiate intelligent synchronization at a time when the network offers high bandwidth. Yet, in some embodiments the mobile device may detect that it is in a docking cradle and automatically initiate synchronization while docked.

Current solutions to the problem of keeping mobile devices synchronized with central databases are not efficient because they require the user to select individual items for synchronization—a tedious, time consuming, error prone process (the user is subject to overlooking an important table to synchronize)—or to select all available data which consumes excessive communications bandwidth and may overflow available mobile memory resources. Aspects of the present invention overcome both these problems by supporting a repeatable, customizable process for synchronizing only that data which is needed to be updated. Aspects of the present invention may allow for the deployment of a uniform process to a group of users so all the mobile users synchronize in the same way. Thus, the aspects of the invention allow for data linking schema creation both by authorized users and by administrators. Users who are authorized can create and customize their data linking schemas. Users who do not have the time or the training to learn how to create and customize their data linking schemas can have these schemas created for them by an administrator.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A method comprising:
    initiating a synchronization session between a server and a mobile device;
    receiving an indication at the server of a starting point for a data linking schema to select data from one or more databases, the starting point comprising a value associated with a record of a selected one of the databases;
    identifying, at the server, a correspondence between the starting point and entries in records of the selected database and entries in records of another of the databases based on the value, so as to define the data linking schema;
    determining, at the server, records that are linked by the value based on the defined data linking schema during the synchronization session;
    gathering the data from the linked records in the selected database and the other database during the synchronization session; and
    transmitting the data to the mobile device.

2. The method of claim 1 further comprising receiving information from the mobile device based on a previous data linking schema.

3. The method of claim 1 further comprising:
    receiving an indicator for a maximum amount of data to be sent;
    stopping the transmitting of data when the maximum amount of data has been sent.

4. The method of claim 1 further comprising:
    receiving an indicator for a maximum amount of data to be sent for a predetermined program application; and
    stopping the transmitting of data relating to the program application when the maximum amount of data has been sent.

5. A communication system, comprising:
    an enterprise database,
    a server configured to:
        selectively read data from the enterprise database and data from one other database based on a data linking schema;
        receive an indication of a starting point for the data linking schema, the starting point comprising a value associated with a record of the enterprise database;
        identify a correspondence between the starting point and entries in records of the enterprise database and in entries in records of the other database based on the value, so as to define the data linking schema;
        determine records that are linked by the value based on the defined data linking schema;
        transmit data indicative of entries that are to be linked according to the data linking schema during a synchronization session with a mobile device; and
        receive the data from the linked records in the enterprise database and the other database during the synchronization session.

6. The communication system of claim 5, wherein the server is further configured to transmit the data to the mobile device.

7. The communication system of claim 5, wherein the server is further configured to determine a maximum amount of data to be transmitted dependent on available resources on the mobile device.

8. The communication system of claim 5, wherein the server is further configured to send instructions to delete specified data in a cache of the mobile device.

9. A non-transitory computer-readable medium having encoded thereon instructions for performing a method, the method comprising:
- initiating a synchronization session between a server and a mobile device;
- receiving an indication at a server of a starting point for a data linking schema to select data from one or more databases, the starting point comprising a value associated with a record of a selected one of the databases;
- identifying, at the server, a correspondence between the starting point and entries in records of the selected database and entries in records of another of the databases based on the value, so as to define the data linking schema;
- determining, at the server, records that are linked by the value based on the defined data linking schema during the synchronization session;
- gathering the data from the linked records in the selected database and the other database during the synchronization session; and
- transmitting the data to the mobile device.

10. The non-transitory computer-readable medium of claim 9, wherein the method further comprises:
- receiving an indicator for a maximum amount of data to be sent;
- stopping the transmitting of data when the maximum amount of data has been sent.

11. The non-transitory computer-readable medium of claim 9, wherein the method further comprises:
- receiving an indicator for a maximum amount of data to be sent for a predetermined program application; and
- stopping the transmitting of data relating to the program application when the maximum amount of data has been sent.

12. The non-transitory computer-readable medium of claim 9, wherein the method further comprises receiving information from the mobile device based on a previous data linking schema.

13. A server comprising:
- a memory; and
- a processor coupled to the memory, the processor and the memory being cooperatively configured to:
  - initiate a synchronization session with a mobile device;
  - receive an indication of a starting point for a data linking schema to select data from one or more databases, the starting point comprising a value associated with a record of a selected one of the databases;
  - identify a correspondence between the starting point and entries in records of the selected database and entries in record of another of the database based on the value, so as to define the data linking schema;
  - determine records that are linked by the value based on the defined data linking schema during the synchronization session;
  - gather the data from the linked records in the selected database and the other database during the synchronization session; and
  - transmit the data to the mobile device.

14. The server of claim 13, wherein the processor and the memory are further cooperatively configured to:
- receive an indicator for a maximum amount of data to be sent;
- stop the transmitting of data when the maximum amount of data has been sent.

15. The server of claim 13, wherein the processor and the memory are further cooperatively configured to:
- receive an indicator for a maximum amount of data to be sent for a predetermined program application; and
- stop the transmitting of data relating to the program application when the maximum amount of data has been sent.

16. The server of claim 13, wherein the processor and the memory are further cooperatively configured to receive information from the mobile device based on a previous data linking schema.

17. A mobile device comprising:
- a processor configured to:
  - transmit a synchronization request to a server, the synchronization request indicating a starting point for a data linking schema to select data from one or more databases, the starting point comprising a value associated with a record of a selected one of the databases, wherein a correspondence between the starting point and entries in records of the selected database and entries in records of another of the databases based on the value define the data linking schema; and
- receive data gathered by the server from records of the selected database and the other database during a synchronization session, wherein said records are linked by the value based on the defined data linking schema; and
- a memory coupled to the processor, the memory being configured to store the received data.

18. The mobile device of claim 17, wherein the processor is further configured to set a maximum amount of data to be received.

* * * * *